United States Patent [19]

Rokujo et al.

[11] Patent Number: 4,582,632

[45] Date of Patent: Apr. 15, 1986

[54] NON-PERMEABLE CARBONACEOUS FORMED BODIES AND METHOD FOR PRODUCING SAME

[75] Inventors: Masaharu Rokujo, Kanagawa; Hisaaki Yokota, Chigasaki; Eiji Saura, Kanagawa; Mitsunobu Nikaido, Motomachi; Morihiko Sugino, Kobe, all of Japan

[73] Assignee: Kabushiki Kaisha Kobe Seiko Sho, Kobe, Japan

[21] Appl. No.: 598,540

[22] Filed: Apr. 10, 1984

[30] Foreign Application Priority Data

| Apr. 11, 1983 | [JP] | Japan | 58-63505 |
| Oct. 25, 1983 | [JP] | Japan | 58-199538 |
| Oct. 25, 1983 | [JP] | Japan | 58-199537 |
| Oct. 25, 1983 | [JP] | Japan | 58-199539 |

[51] Int. Cl.$^4$ .................. H01B 1/04; G01B 31/00
[52] U.S. Cl. .................. 252/502; 264/29.5; 264/29.6; 264/29.7; 423/445; 423/448; 423/449
[58] Field of Search .......... 264/29.5, 29.6, 29.7, 264/29.1; 423/445, 448, 449; 252/502

[56] References Cited

U.S. PATENT DOCUMENTS

| 3,084,394 | 4/1963 | Bickerdike et al. | 264/29.5 |
| 3,322,866 | 5/1967 | Bentolila et al. | 264/29.5 |
| 3,517,092 | 6/1970 | Peterson | 264/29.5 |
| 3,671,385 | 6/1972 | Trent et al. | 264/29.5 X |
| 3,907,950 | 9/1975 | Bickerdike et al. | 264/29.5 |
| 4,086,380 | 4/1978 | Juel et al. | 264/29.5 X |
| 4,137,477 | 1/1979 | Krol et al. | 252/502 X |
| 4,205,055 | 5/1980 | Maire et al. | 423/445 |
| 4,221,773 | 9/1980 | Tsukagoshi et al. | 423/445 |
| 4,226,900 | 10/1980 | Carlson et al. | 264/29.5 X |
| 4,348,343 | 9/1982 | Akerberg et al. | 264/29.5 |
| 4,360,485 | 11/1982 | Emanuelson et al. | 264/29.5 |
| 4,366,191 | 12/1982 | Gistinger et al. | 264/29.6 X |
| 4,399,052 | 8/1983 | Sugino | 264/29.1 X |
| 4,426,368 | 1/1984 | Quella et al. | 423/449 X |
| 4,459,453 | 7/1984 | Inoue | 252/502 X |

FOREIGN PATENT DOCUMENTS 52-68096  6/1977  Japan ................. 264/29.5

OTHER PUBLICATIONS

WO80/02552 11/27/80 PCT International Application, Ubbelohde, Alfred, 27 pp.

*Primary Examiner*—Philip Anderson
*Attorney, Agent, or Firm*—Oblon, Fisher, Spivak, McClelland & Maier

[57] ABSTRACT

Non-permeable carbonized formed bodies consisting of carbonaceous material containing 5–50 wt % of graphite and the balance of glassy carbon formed by bake-carbonization of a thermosetting resin, and a method for producing such non-permeable carbonized formed bodies comprising mixing and kneading a thermosetting resin powder, thermosetting resin liquid and graphite powder, drying, hardening and bake-carbonizing the resultant body is disclosed.

12 Claims, 5 Drawing Figures

NON-PERMEABLE CARBONACEOUS FORMED BODIES AND METHOD FOR PRODUCING SAME

BACKGROUND OF THE INVENTION

1. Field of the Invention

This invention relates to a method for producing non-permeable carbonaceous formed bodies.

In addition to good non-permeability to gases and liquids, non-permeable carbonaceous formed bodies possesses excellent properties such as low electric resistance and strong resistance to chemicals, so that they are expected to find wide industrial applications in electronic, neuclear and aeronautic fields, and above all the above-mentioned properties are suitable for use as separating sheets in phosphate type fuel cells which are attracting attention of many concerns in these days.

2. Description of the Prior Art

The phosphate type fuel cell consists of, for example, a plural number of layered unit cells each having a matrix impregnated with phosphate serving as an electrolyte, a pair of porous catalyst-carrying electrode plates grippingly holding the opposite sides of the matrix, and separating sheets laid on the outer sides of the electrode plates. More particularly, in the case of a fuel cell of the so-called ribbed electrode type, each electrode plate is provided with ribs on the side of the separating sheet to supply a fuel gas or an oxidizing gas to the grooves between the respective ribs. Namely, a gaseous fuel such as hydrogen gas is fed to the grooves on one plate while a gaseous oxidizer such as air and oxygen is fed to the grooves on the other plate, to effect the cell reaction. Accordingly, the separating sheet which is supplied with a fuel on one side and with an oxidizing agent on the other side thereof is required to have excellent non-permeability to gases to prevent mixing of these gases. Besides, it is required to have high electric conductivity along with high compessive and bending strengths in the form of stratified thin sheets, in order to function as a collector of the fuel cell which is constituted by layered unit cells as mentioned above.

However, non-permeable carbon moldings which have thus far been known in the art are all found to be unsatisfactory in the above-mentioned properties. For example, Japanese Laid-Open Patent Specification No. 54-20991 discloses a method of preparing carbon moldings consisting substantially of glassy carbon alone by mixing and kneading fine powder of thermosetting phenol resin and a primary phenol-aldehyde condensate and, after molding to shape, burning the moldings for carbonization. However, the moldings obtained by this method undergo considerable volumetric contraction of the resin in the burning stage, resulting in low density with inferior non-permeability to gases and in low physical strength when formed into a thin sheet of a thickness of 0.4–1.5 mm which is generally adopted for separation sheets in actual applications.

On the other hand, there have also been known various graphite type non-permeable carbonaceous moldings which is obtained, for example, by a method of filling an impregnant such as pitch, tar, resin or the like in pores of graphitic moldings obtained by bake-carbonization, and carbonizing the impregnant by a secondary baking operation. This method is, however, objectionable in that the bake-carbonized products are susceptible to cracking due to a difference in thermal contraction between the graphitic moldings and impregnant.

Further, disclosed in Japanese Laid-Open Patent specification No. 57-72273 is a method of molding graphite power with the use of a phenol resin solution and baking the resulting moltings at a high temperature to obtain a non-permeable carbonized product consisting substantially of graphite in its entirety. This method also involves the problem of cracking in the baking stage due to a difference in thermal contraction between graphite and binder, coupled with the necessity for impregnating the binder repeatedly in order to impart sufficient non-permeability to moldings, which invariably results in increases in the number of steps of the manufacturing process and in the production cost.

SUMMARY OF THE INVENTION

With the foregoing situations in view, the present invention has as its object the provision of a method which can eliminate the above-mentioned drawbacks or problems of the conventional methods.

It is a more particular object of the present invention to provide non-permeable carbonaceous formed bodies which are improved in physical strengths especially in layered compressive strength and bending strength, and a method for producing such non-permeable carbonaceous formed bodies.

According to one aspect of the present invention, there are provided non-permeable carbonaceous formed bodies, characterized in that the carbonaceous formed bodies consist of 5–50 wt% of graphite and the balance of glassy carbon formed by bake-carbonization of a thermosetting resin material.

According to the invention, there is also provided a method for producing non-permeable carbonaceous formed bodies, characterized in that the method comprises kneading and forming to shape a composition containing a thermosetting resin powder, graphite powder and a thermosetting resin liquid in such proportion that the formed structure will, after bake-carbonization, consist of 5–50 wt% of graphite and the balance of glassy carbon formed by carbonization of the themosetting resin, and, after drying and hardening treatments, bake-carbonizing the hardened molded structure in a non-oxidizing atmosphere.

The above and other objects, features and advantages of the present invention will become apparent from the following description and appended claims, taken in conjunction with the accompanying drawings.

DESCRIPTION OF PREFERRED EMBODIMENTS

Figure 1:
FIG. 1 is an electron microphotograph (1000 magnification) showing the surface of non-permeable carbonaceous formed bodies in Example 1 of the present invention.

In the following description of the present invention, the term "thermosetting resin powder" means a thermosetting resin powder which can be formed into glassy carbon in a non-oxidizing atmosphere at a temperature of 800°–2000° C., preferably at a temperature of 1000°–1500° C., and its examples generally include phenol resin, furan resins, xylene resins, melamine resins, anylin resins and the like, of which phenol resin powder is most suitably used. On the other hand, examples of the thermosetting resin liquid suitable for use in the present invention include aqueous or organic adhesives of phenol resin, xylene resins, melamine resins, urea resins, epoxy resins, furan resins and the like. The resin liquid may be in the form of a solution, emulsion or suspension. Although there in no particular restriction in this regard, it is preferred to employ an aqueous resin liquid in consideration of the convenience in a drying stage. The above-mentioned powder of thermosetting resins and resin liquids may be used singly or in the form of a mixture consisting of two or more kinds of resins. However, it is preferred that the thermosetting resin and the resin component in the resin liquid are of the same kind. The resin liquid facilitates kneading and forming to shape of the thermosetting resin and graphite powder, and, after hardening by heating, contributes to the formation of a graphite matrix by forming glassy carbon together with the thermosetting resin powder in the baking stage.

In this manner, the thermosetting resin powder and the resin component in the resin liquid are converted into glassy carbon by bake-carbonization in a non-oxidizing atmosphere. According to the method of the present invention, it is preferred to mix the thermosetting resin powder and thermosetting resin liquid uniformly with graphite followed by kneading to prepare a homogeneous forming mixture of such composition that the graphite-containing carbonaceous structure which will be produced by the bake-carbonization consists of 5–50 wt% of graphite and the balance of glassy carbon originating from the thermosetting resin powder and the thermosetting resin component of the resin liquid. In addition, the thermosetting resin powder to be used in the present invention is preferred to have an average particle size smaller than 50 μm, and the graphite powder is preferred to have a particle size smaller than $\frac{1}{2}$ of the average particle size of the thermosetting resin powder.

According to the present invention, although the resin components in the thermosetting resin powder and the resin liquid undergo thermal contraction due to dehydration in the bake-carbonizing stage, it is possible to obtain a densified molding structure with good non-permeability to gases as well as good strength owing to the effect of compacting densification of graphite which is free of thermal contraction and which exists in the above-defined range, desirably when the thermosetting resin and graphite have average particle sizes in the above-defined ranges. If the proportion of graphite in the total quantity of carbonaceous material which is produced from graphite and thermosetting resin as a result of bake-carbonization of the formed bodies is less than 5 wt%, it becomes difficult to achieve the compacting densification with graphite of the glassy carbon structure. On the other hand, if the proportion of graphite exceeds 50 wt%, it becomes difficult to attain densification by baking of the thermosetting resin powder and the thermosetting resin in the resin liquid, rather lowering to a considerable degree the strength of glassy carbon which binds graphite particles and thus degrading the gas non-permeability of the resulting formed bodies. Further, in a case where the average particle size of the thermosetting resin exceeds 50 μm, it is also difficult to produce moldings of high density and strength. If the average particle size of graphite is greater than $\frac{1}{2}$ of the average particle size of the thermosetting resin to be used, internal stress will occur upon bake-carbonization of the thermosetting resin and the resin liquid, likewise lowering the strength of formed bodies to be obtained.

According to the method of the present invention, the thermosetting resin powder, graphite and resin liquid are kneaded uniformly, formed into a desired shape by pressing, extruding, rolling or other suitable methods, and then dried to evaporate the solvent of the resin liquid, followed by heating for setting the resin or resins and bake-carbonization.

According to the method of the present invention, it is preferred to add to the kneaded composition an organic tackifier which is soluble in the resin liquid and decomposed or evaporated in the bake-carbonizing stage, for the purpose of improving formability of the kneaded composition consisting of the thermosetting resin powder, graphite powder and thermosetting resin liquid, especially for improving its lubricity and shape retainability in extrusion formed bodies as well as its extensibility to prevent occurrence of fine cracks in rolling operation and for adjusting the specific gravity of the ultimate non-permeable carbonaceous formed bodies from the standpoint of improving the gas non-permeability and strength of the formed bodies. In a case where the thermosetting resin liquid is an aqueous resin liquid as mentioned hereinbefore, it is necessary to use an organic tackifier of a water soluble type. Examples of suitable tackifiers include methyl cellulose, carboxymethyl cellulose, carboxymethyl starch, hydroxymethyl cellulose, hydroxypropyl cellulose, sodium lignosulfonate, calcium lignosulfonate, polyvinyl alcohol, ester of polyacrylic acid, ester of polymethacrylic acid, guagum, salt of alginic acid and the like.

According to the present invention, the weight ratio of the graphite content in the carbonaceous material of the non-permeable moldings is held to 5–50% as mentioned hereinbefore, and at the same time the additive amount of the organic tackifier is adjusted so that the non-permeable carbonaceous forming will have a predetermined specific gravity as a function of the above-mentioned weight ratio to guarantee a gas permeability smaller than $10^{-4}$ cc/min.cm$^2$.atmospheric pressure per unit thickness in mm.

In order to secure the formability improving effect of the tackifier, its content is preferred to be at least 1 wt% in the kneaded composition consisting of the thermosetting resin powder, graphite powder, thermosetting resin liquid and tackifier. On the other hand, the additive amount of the tackifier is also determined from the standpoint of adjusting the specific gravity of the ultimate non-permeable carbonaceous formed bodies. Greater the additive amount of the tackifier, the smaller becomes the specific gravity of the bake-carbonized non-permeable products. Accordingly, an excessive content of the tackifier will reduce the specific gravity of the ultimate formed bodies by its decomposition and evaporation in the bake-carbonizing stage, undesirably lowering the non-permeability and strengths of the formed bodies.

According to the present invention, when the weight ratio of graphite/carbonaceous material of the carbonized non-permeable moldings is x(%), the specific gravity y of the ultimate carbonized formed bodies is controlled to fall in the range of $$y \geq 0.004x + 1.235$$

thereby to secure a gas permeability smaller than $10^{-4}$ cc/min. cm². atmospheric pressure per unit thickness in mm.

There is no restrictions with regard to the method for kneading the mixture consisting of the thermosetting resin powder, graphite powder, a thermosetting resin liquid and preferably an organic tackifier, and an ordinary conventional kneader may be employed for this purpose. The kneaded composition is then extruded into, for example, a predetermined sheet-like form by means of an extruder, which may also be an ordinary conventional extruder, for example, a screw type extruder or a plunger type extruder. In the case of a screw type extruder, it can also be used for kneading the molding composition.

The extruded material is then rolled at least two times with a reduction rate greater than 1/5 each time. This is because reduction of thickness to a predetermined value by a single pass has possibilities of including air into the formed bodies or imparting a particular directionability to the thermosetting resin powder or graphite powder, giving rise to irregular layers and fine cracks of particular directionabilities. In order to prevent impartment of such directionabilities, it is preferred to roll the extruded material through a number of passes, including rolling in a direction perpendicular to the extruded direction.

In the rolling stage, the thermosetting resin liquid often tends to stick on the roll surfaces, making it difficult to release a rolled sheet from the roll. To avoid this, it is preferred to interpose a releasing sheet between the extruded material and working rolls and/or to apply a lubricative means on the surfaces of the rolls thereby to ensure smooth rolling operation on the extruded material. Expecially, in a case using a releasing sheet of polytetrafluoroethylene or applying the polymer on the surfaces of the working rolls, it is possible not only to roll the extruded sheet in an extremely smooth manner but also to obtain non-permeable carbonaceous formed bodies of improved surface quality.

Figure 4:
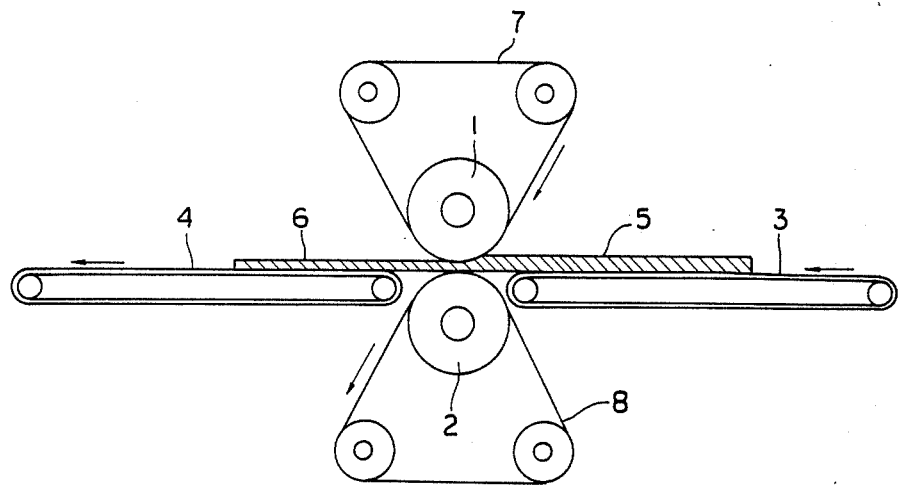
FIG. 4 is a schematic view of a rolling mill suitable for use in the method of the present invention.

Referring to FIG. 4, there is illustrated an example of a preferred rolling operation using a feeding conveyer belt 3 and a discharging conveyer belt 4 of polytetrafluoroethylene on opposite sides of a pair of working rolls 1 and 2. Material 5 to be rolled is sent forward by the feeding belt toward and between the working rolls and a rolled material of a predetermined thickness is sent forward by the discharging belt. The opposing surfaces of the working rolls which contact the formed sheet material are covered by releasing sheets 7 and 8 of polytetrafluoroethylene which are respectively passed around the upper and lower working rolls to prevent deposition of the formed sheet material.

The rolled sheet is then dried to evaporate the solvent in the thermosetting resin liquid, and heated to harden the thermosetting resin. The resin setting temperature is selected suitably depending the kind of resin and the shape of formed bodies and normally in the range of 100°–180° C.

Preferably, hardened formed bodies resulting from the resin setting heat treatment is impregnated with a thermosetting resin liquid. A thermosetting resin liquid may be impregnated into the hardened moldings under normal pressure but it is preferred to hold the hardened moldings under reduced pressure to let the thermosetting resin liquid penetrate and reach internal pores of the formed bodies. Desirably, the formed bodies which are impregnated with the thermosetting resin liquid are then held under pressure so that the internal pores are filled with the resin liquid. This impregnating resin liquid is preferred to be of the same thermosetting resin as the thermosetting resin powder used for the preparation of the kneaded composition. By impregnating a thermosetting resin liquid into the hardened moldings in this manner prior to bake-carbonization, there can be obtained carbonized formed bodies of higher density which are substantially free of pores and further improved in non-permeability.

The hardened formed bodies thus formed are then subjected to bake-carbonization in a non-oxidizing atmosphere, normally in helium, argon or nitrogen gas. With regard to the temperature of bake-carbonization for the production of non-permeable carbonaceous formed bodies, it is desirable to heat the formed bodies at a low heating speed of several tens degrees centigrade per hour in a temperature range of from about 200° C. to about 500° C. or 600° C. as described, for example, in Japanese Laid-Open Patent Specification No. 57-72273 mentioned hereinbefore. Thereafter, the temperature is raised to a predetermined bake-hardening temperature at a heating speed in the above-mentioned range or at a higher heating speed, baking the formed bodies for a predetermined time period to obtain the non-permeable carbonaceous formed bodies according to the present invention. The temperature of bake-carbonization is in the range of 800° C.–2000° C., preferably in the range of 1000° C.–1500° C. The baking time depends upon the shape and size of the formed bodies and should be long enough for carbonizing and converting stantially all of the thermosetting resin into glassy carbon, which normally takes a time period of from several hours to several tens hours.

According to the present invention, in order to further enhance the strength of the ultimate formed products, the forming raw material consisting of the thermosetting resin powder, graphite and thermosetting resin liquid may be added with a suitable amount of a substance which shows high bondage to the carbon matrix of the formed bodies, such as carbon black, metal carbides such as silicon carbide, titanium carbide and tungsten carbide, and carbon fibre. The shaped bodies are dried and baked in the same manner as described hereinbefore.

It will be appreciated from the foregoing description that, according to the present invention, graphite, thermosetting resin powder and thermosetting resin liquid are mixed and kneaded such that the baked carbonaceous material consisting of graphite and glassy carbon formed by the bake-carbonization of the thermosetting resin contains graphite in a predetermined proportion, followed by formed body and bake-carbonization to convert the thermosetting resin into glassy carbon. Therefore, graphite is uniformly dispersed in the matrix of glassy carbon which is formed by bake-carbonization of the thermosetting resin, producing a dense carbonaceous structure without cracking. The resultant non-permeable carbonaceous formed bodies are improved not only in non-permeability to gases and liquids but also in strengths such as laminated compressive strength and bending strength and electric conductivity.

The invention is illustrated more particularly by the following examples, which are given for the purpose of illustration and should not be construed as being limitative of the scope of the present invention.

EXAMPLE 1

Powder of phenol formaldehyde having an average particle size of 39 μm and graphite consisting of more than 99% of fixed carbon and having an average particle size of 12 μm were kneaded with addition of a phenol resin liquid (50% in concentration) in such proportions that graphite would be contained at the rates shown in Table 1 in the carbonaceous material consisting of glassy carbon formed by bake-carbonization of the thermosetting resin and graphite, and then molded into a thin sheet-like form. The sheet was dried at 30° C. for 4 hours, and heated at 110° C. for 6 hours for hardening the thermosetting resin. Thereafter, the sheet was placed in a furnace and heated in an argon atmosphere up to 700° C. at a heating speed of 40° C./hour and then up to 1300° C. at a heating speed of 100° C./hour, retaining the final temperature for 1 hour. As a result, there was obtained a non-permeable carbonaceous moldings of 1 mm in thickness, 100 mm in length and 70 mm in width.

Figure 2:
FIG. 2 is a view similar to FIG. 1 but showing the surface of non-permeable carbonaceous formed bodies in a comparative example with no graphite content.

Hydrogen permeability (H.P.), electric resistance (E.R.) in the longitudinal direction, bending strength (B.S.) and stratified compressive strength (S.C.S.) of the moldings obtained in this manner are shown in Table 1. Further, shown in FIGS. 1 and 2 are electron microphotographs (magnification: 1000) of the surfaces of non-permeable carbonized moldings in an example (contaning 15 wt% of graphite in the carbonaceous material) and in a comparative example (containing 0 wt% of graphite in the carbonaceous material) of Table 1, respectively. It will be observed therefrom that the non-permable formed bodies according to the invention has a carbonaceous structure of high density substantially free of pores, in contrast to the formed bodies of the comparative example which contain pores in the carbonaceous structure.

EXAMPLE 2

Example 1 was repeated except for the use of a resin liquid mixture (65% in total resin concentration) prepared by mixing phenol resin liquid (70 wt%) and fran resin liquid (30 wt%), obtaining non-permeable carbonaceous formed bodies of the same dimensions containing graphite in different proportions in the carbonaceous material consisting of glassy carbon formed by bake-carbonization of the thermosetting resin and graphite, as shown in Table 2. Hydrogen permeability, electric resistance in the longitudinal direction, bending and laminated compressive strengths of the resulting formed bodies are shown also in Table 2.

EXAMPLE 3

Example 1 was repeated except that furan resin powder having an average particle size of 41 μm and a furan resin liquid (80% in concentration) were used as thermosetting resin powder and resin liquid, respectively, obtaining non-permeable carbonaceous formed bodies of the same containing graphite in different proportions in the carbonaceous material consisting of glassy carbon formed by bake-carbonization of the thermosetting resin and graphite. Hydrogen permeability, electric resistance in the longitudinal direction and bending and laminated compressive strengths of the resultant formed bodies are shown in Table 3.

TABLE 1

|  | Specimen out of invention | Specimens according to invention | | | Specimen out of invention |
| --- | --- | --- | --- | --- | --- |
| Graphite (wt. %) | 0 | 5 | 15 | 45 | 80 |
| H.P. ($cm^2$/sec) | $10^{-3}$ | $10^{-4}$ | $10^{-5}$ | $10^{-5}$ | $10^{-4}$ |
| E.R. (cm · Ω) | $5 \times 10^{-3}$ | $4 \times 10^{-3}$ | $3.2 \times 10^{-3}$ | $2.9 \times 10^{-3}$ | $1.2 \times 10^{-3}$ |
| B.S. (kg/$cm^2$) | 350 | 610 | 830 | 680 | 470 |
| S.C.S.* | 17 | 1 | 0 | 0 | 24 |

N.B.*: Number of cracked sheets out of 30 sheet moldings loaded with a pressure of 2000 kg/cm. The same applies to Table 2 and 3.

TABLE 2

|  | Specimen out of invention | Specimens according to invention | | | Specimen out of invention |
| --- | --- | --- | --- | --- | --- |
| Graphite (wt. %) | 0 | 5 | 15 | 45 | 80 |
| H.P. ($cm^2$/sec) | $10^{-3}$ | $10^{-4}$ | $10^{-5}$ | $10^{-5}$ | $10^{-4}$ |
| E.R. (cm · Ω) | $5 \times 10^{-3}$ | $4 \times 10^{-3}$ | $3.2 \times 10^{-3}$ | $2.9 \times 10^{-3}$ | $1.2 \times 10^{-3}$ |
| B.S. (kg/$cm^2$) | 380 | 610 | 790 | 700 | 480 |
| S.C.S.* | 15 | 0 | 0 | 0 | 3 |

TABLE 3

|  | Specimen out of invention | Specimens according to invention | | | Specimen out of invention |
| --- | --- | --- | --- | --- | --- |
| Graphite (wt. %) | 0 | 5 | 15 | 45 | 80 |
| H.P. ($cm^2$/sec) | $10^{-3}$ | $10^{-4}$ | $10^{-4}$ | $10^{-4}$ | $10^{-4}$ |
| E.R. (cm · Ω) | $5 \times 10^{-2}$ | $4 \times 10^{-3}$ | $3.2 \times 10^{-3}$ | $2.9 \times 10^{-3}$ | $1.2 \times 10^{-3}$ |
| B.S. (kg/$cm^2$) | 450 | 600 | 780 | 700 | 510 |
| S.C.S.* | 12 | 2 | 0 | 0 | 8 |

EXAMPLE 4

100 parts of phenol.formaldehyde resin powder having an average particle size of 39 μm, 18 parts of graphite powder containing more than 99% of fixed carbon and having an average particle size of 12 μm, carbosymethylcellulose of an amount indicated in Table 4 and 68 parts of an aqueous phenol resin liquid (48 wt% in concentration) were mixed and kneaded, and extruded by a plunger type extruder into a sheet of 500 mm in width and 25 mm in thickness in section. The extrudate was then rolled by a 400 mm diameter 2-roll rolling mill, rolling in the first stage into a thickness of 8.0 mm in a direction perpendicular to the extruded direction, in the second stage into a thickness of 3.6 mm in the extruded direction, and in the third stage into a thickness of 1.7 mm in a direction perpendicular to the extruded direction.

After leaving in a heat retaining vessel of 40° C. for 8 hours, the rolled sheet was heated at 110° C. for 12 hours to harden the thermosetting resin. Thereafter, the sheet was placed in a baking furnace and heated in an argon atmosphere up to 700° C. at a heating speed of 40° C./hour and then up to 1300° C. at a heating speed of 100° C./hour, retaining the final temperature for 2 hours to obtain a thin sheet-like non-permeable carbonaceous molding of 1.0 mm in thickness, 500 mm in width and 500 mm in length.

The weight ratio of graphite/carbonaceous material of the resulting molded sheet was 21%, and the specific gravity of the molded specimen was 1.319 according to the above-mentioned equation. As shown in Table 4 below, specimens of moldings with a greater specific gravity exhibited a nitrogen permeability smaller than $10^{-4}$ cc/cm.minute.atm. Also shown in Table 4 are the electric resistance in the longitudinal direction and bending strength of the respective specimens.

TABLE 4

|  | CMC (parts by weight) | Specific gravity (g/cm$^3$) | Nitrogen permeability (cc/min · cm$^2$ · atm) | Electric resistance (Ωcm) | Bending strength (kg/cm$^2$) |
| --- | --- | --- | --- | --- | --- |
| Specimens of invention | 6.2 | 1.402 | $5 \times 10^{-5}$ | $3.2 \times 10^{-3}$ | 837 |
|  | 4.9 | 1.413 | $<10^{-5}$ | $3.2 \times 10^{-3}$ | 921 |
| Out of invention | 15.3 | 1.295 | $3.4 \times 10^{-3}$ | $4.1 \times 10^{-3}$ | 625 |
|  | 21.0 | 1.191 | $2 \times 10^{-3}$ | $4.9 \times 10^{-3}$ | 338 |

EXAMPLE 5

Example 4 was repeated except that the additive amount of carboxymethyl cellulose was varied in a number of ways, preparing specimens of non-permeable carbonaceous formed bodies with different values of 8%, 21%, 30% and 43% in the weight ratio of graphite/carbonaceous material of bake-carbonized moldings. According to the afore-mentioned equation, the values of specific gravity for the moldings with these values in the weight ratio of graphite/carbonaceous material are 1.267, 1.319, 1.355 and 1.407, respectively.

Figure 3:
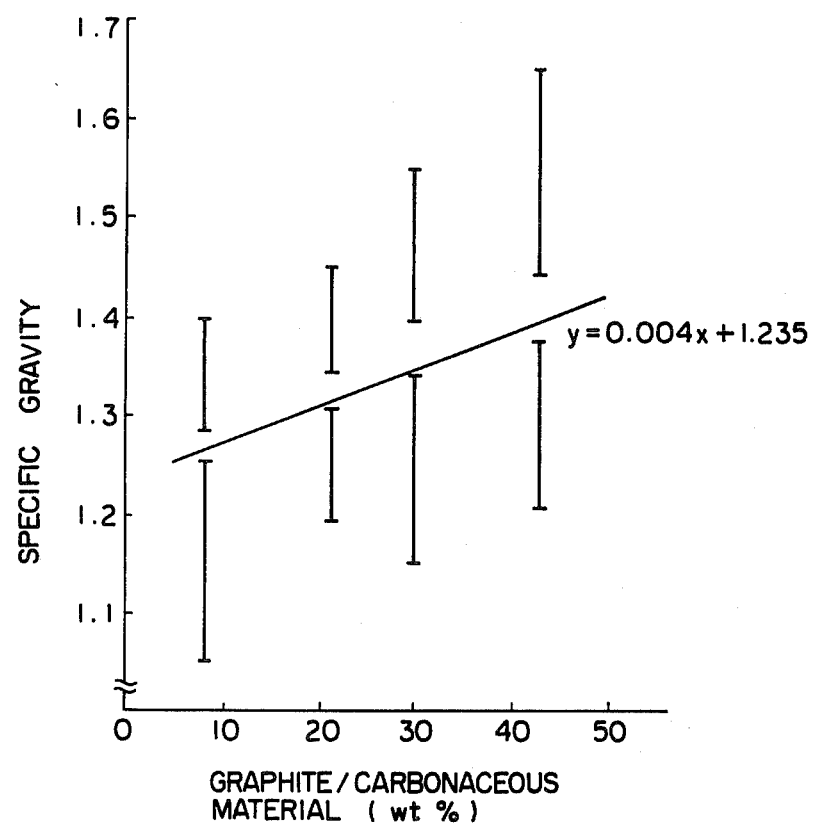
FIG. 3 is a graph showing the weight ratio of graphite/carbonaceous material of non-permeable carbonized formed bodies in relation with specific gravity and nitrogen non-permeability.

The nitrogen permeability of the resulting carbonized formed bodies are shown in FIG. 3 in relation with the weight ratio of graphite/carbonaceous material and specific gravity. The vertical lines which are located above the line of $y=0.004x+1.235$ indicate groups of moldings with a nitrogen permeability smaller than $10^{-4}$ cc/min.cm.atm. while the lower lines indicate groups of formed bodies with a nitrogen permeability greater than $10^{-4}$ cc/min.cm.atm.

It will be clear therefrom that the nitrogen permeability is restricted by the specific gravity at a given weight ratio of graphite/carbonaceous material and that satisfactory nitrogen non-permeability smaller than $10^{-4}$ cc/min.cm.atm can be achieved when the specific gravity is greater than the value determined by the aforementioned formula.

In a comparative example which was same in as Example 4 except that the weight ratio of graphite/carbonaceous material was 0%, the nitrogen permeability was equal to or greater than $10^{-4}$ cc/min.cm.atm and the bending strength was 350 kg/cm$^2$. In a case where the weight ratio of graphite/carbonaceous material was 85%, the specific gravity became 1.6-1.8 but the nitrogen permeability changed depending upon the specific gravity and the bending strength was 470 kg/cm$^2$.

EXAMPLE 6

100 parts of phenol.formaldehyde resin powder having an average particle size of 39 microns, 10 parts of graphite powder containing more than 99% of fixed carbon and having an average particle size of 12 microns, 9 parts of carboxymethyl cellulose serving as a water soluble tackifier, 3 parts of hydroxypropylcellulose and 23 parts of aqueous phenol resin liquid (50 wt% in concentration) were mixed and kneaded, and extruded by a plunger type extruder into a sheet-like form with a width of 500 mm and a thickness of 20 mm in section. The molded sheet was then rolled on a 400 mm diameter 2-roll rolling mill, rolling in a first stage into a thickness of 7.0 mm in a direction perpendicular to the extruded direction, in a second stage to a thickness of 3.2 mm in the extruded direction and in a third stage to a thickness of 1.0 mm in a direction perpendicular to the extruded direction.

After leaving in a temperature retaining vessel at 40° C. for 8 hours, the rolled sheet material was heated at 110° C. for 12 hours to set the resins. Thereafter, the sheet material was placed in a baking furnace and heated up to 700° C. at a heating speed of 40° C./hour and then up to 1300° C. at a heating speed of 100° C./hour, retaining the final temperature for 2 hours to obtain thin non-permeable carbon sheet of 0.6 mm in thickness, 500 mm in width and 500 mm in length.

The carbonized molding thus obtained exhibited a flatness of ±0.02 or smaller, and a nitrogen permeability of $4 \times 10^{-4}$ cc/min.cm$^2$ at a differential pressure of 1 kg/cm$^2$, an intrinsic electric resistance of $3.5 \times 10^{-3}$ Ω.cm, and a three-point bending strength of 721 kg/cm$^2$.

EXAMPLE 7

Example 6 was repeated except that a furan resin liquid (48 wt%) was used as a resin liquid instead of a phenol resin liquid, obtaining specimens of non-permeable carbon formed bodies of the same dimensions.

These specimens also exhibited a flatness of ±0.02 or smaller, a nitrogen permeability of $6 \times 10^{-4}$ cc/min.cm², an intrinsic electric resistance of $3.8 \times 10^{-3} \Omega$.cm, and a three-point bending strength of 704 kg/cm².

EXAMPLE 8

Figure 5:
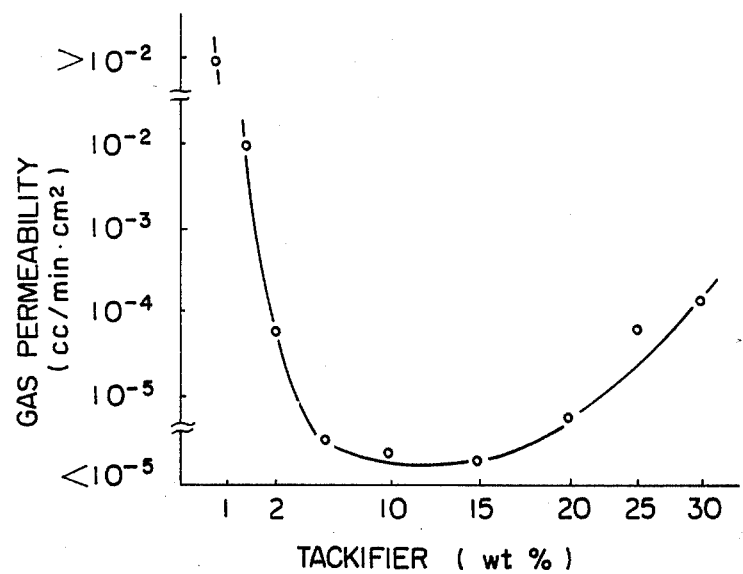
FIG. 5 is a graph showing gas permeability of carbonized formed bodies in relation with the additive amount of tackifier.

Example 6 was repeated except that the water soluble tackifier consisting of carboxymethylcellulose and hydroxypropylcellulose was added to the kneaded composition in glassy amounts, preparing specimens of non-permeable carbon formed bodies of the same size. These specimens of formed bodies showed gas permeability as shown in FIG. 5. It will be seen therefrom that, an additive amount of the tackifier less than 2 wt% of the kneaded composition causes not only a degradation in gas non-permeability but also numerous fine cracks on the surfaces of moldings. On the other hand, if the additive amount of the tackifier exceeds 2 wt% of the kneaded composition, the resulting moldings have a porous structure of low density with inferior gas non-permeability.

EXAMPLE 9

100 parts of phenol.formaldehyde as in Example 6, 23 parts of carbon black and 8 parts of methylcellulose were mixed and kneaded with the use of the same aqueous phenol resin liquid and the kneaded composition was treated in the same manner as in Example 6 to prepare specimens of non-permeable carbon formed bodies.

These specimens showed a nitrogen permeability of $10^{-4}$ cc/min.cm², an intrinsic electric resistance of $5 \times 10^{-3} \Omega$.cm, and a three-point bending strength of 724 kg/cm².

EXAMPLE 10

100 parts of phenol.formaldehyde resin powder having an average particle size of 39 microns, 10 parts of graphite powder consisting of more than 99% of fixed carbon and having an average particle size of 12 microns and 23 parts of aqueous phenol resin liquid were mixed and kneaded, and the resulting compsition was extruded into a sheet-like form by means of a plunger type extruder, followed by rolling.

After keeping in a heat retaining vessel at 30° C. for 4 hours, the rolled sheet was heated at 150° C. for 6 hours to set the resins. Nextly, the molded sheet was placed in a container and, after reducing the pressure in the container, the same phenol resin liquid was filled in the container, immersing the formed bodies sheet in the resin liquid for impregnation. After this, compressed air was introduced into the container to fill the resin liquid into internal pores of the formed sheet under pressure. After relieving the pressure in the container, the formed sheet was taken out and heated at 150° C. for 6 hours to set the resins.

In the next step, the hardened formed bodies was subjected to bake-carbonization in an argon atmosphere at 1800° C. to obtain non-permeable carbonized moldings of 1.0 mm in thickness, 70 mm in width and 100 mm in length. The baking time was 120 hours including the time for raising the temperature from the resin hardening level to the carbonizing level. In the following examples, the baking time has the same meaning and the ultimate non-permeable carbonized formed bodies are of the same dimensions as mentioned above.

EXAMPLE 11

100 parts of phenol.formaldehyde resin powder and 20 parts of an aqueous phenol resin liquid, of the same kinds as in Example 10, were mixed and kneaded, and the resulting kneaded composition was process in the same manner as in Example 10 to obtain non-permeable carbonized formed bodies.

EXAMPLE 12

Example 11 was repeated except that 35 parts of an aqueous furan resin liquid (45 wt% in concentration) was used instead of the aqueous phonol resin liquid, producing non-permeable carbonized formed bodies in the same manner as in Example 11.

EXAMPLE 13 (COMPARATIVE)

Example 10 was repeated except that the formed sheet was subjected to bake-carbonization at 1800° C. for 120 hours immediately after the resin setting heat treatment without impregnating the resin liquid.

EXAMPLE 14 (COMPARATIVE)

Example 13 was repeated except that bake-carbonized sheet was immersed again in an aqueous phenol resin liquid of the same kind as in Example 10 under reduced pressure, and, after impregnating the resin liquid under pressure, the molded sheet was heated at 150° C. for 6 hours to set the resin and then bake-carbonized at 1800° C. for 120 hours in the same manner as in Example 10.

EXAMPLE 15 (COMPARATIVE)

(1) 100 parts of graphite powder and a phenol resin liquid same as in Example 10 were mixed and kneaded, and the resulting kneaded composition was process in the same manner as in Example 10 to obtain non-permeable carbonized formed bodies.

(2) The same kneaded composition was formed and heated to set the resin, and then subjected to bake-carbonization at 1800° C. for 120 hours to obtain non-permeable carbonized formed bodies.

EXAMPLE 16

100 parts of phenol.formaldehyde resin powder same as in Example 10, 23 parts of carbon black, 27 parts of an aqueous phenol resin liquid (50 wt% in concentration) and 8 parts of methylcellulose were kneaded, and the resulting kneaded composition was processed in the same manner as in Example 10 to obtain non-permeable carbonized formed bodies.

EXAMPLE 17 (COMPARATIVE)

(1) A graphite block was cut into a sheet-like form of the above-mentioned dimensions.

(2) A similar graphite sheet was immersed in a phenol resin liquid and, after heating at 150° C. for 6 hours for drying and setting the resin, baked at 1800° C. for 120 hours to obtain a non-permeable carbonized sheet.

The non-permeable carbonized formed bodies obtained in the foregoing Examples 10 to 17 exhibited nitrogen gas permeability at a differential gas pressure of 1 kg/cm², intrinsic electric resistance in the longitudinal direction and three-point bending strength as shown in Table 5 below. It will be seen therefrom that the non-permeable carbonized formed bodies according to the invention are all superior in gas non-permeability.

TABLE 5

| Example | Gas Non-permeability (cc/min·cm²·kg/cm²) | Intrinsic Electric Resistance (Ωcm) | 3-Point Bending Strength (kg/cm²) |
| --- | --- | --- | --- |
| 10 | $<10^{-5}$ | $3.2 \times 10^{-3}$ | 1024 |
| 11 | $10^{-5}$ | $3.5 \times 10^{-3}$ | 718 |
| 12 | $10^{-5}$ | $3.8 \times 10^{-3}$ | 687 |
| 13 | $10^{-3}$ | $3.6 \times 10^{-3}$ | 724 |
| 14 | $10^{-4}$ | $3.3 \times 10^{-3}$ | 735 |
| 15(1) | $>10^{-1}$ | $1.0 \times 10^{-3}$ | 395 |
| 15(2) | $10^{-1}$ | $1.0 \times 10^{-3}$ | 432 |
| 16 | $10^{-4}$ | $3.9 \times 10^{-3}$ | 724 |
| 17(1) | $>10^{-1}$ | $1.0 \times 10^{-3}$ | 283 |
| 17(2) | $>10^{-1}$ | $1.0 \times 10^{-3}$ | 354 |

Although the invention has been described in terms of specific examples, it is to be understood that other forms of the invention may be readily adapted within the scope of the invention as defined by the appended claims.

What is claimed is:

1. Non-permeable carbonized formed bodies consisting of carbonaceous material containing 5–50 wt% of graphite and the balance of glassy carbon formed by bake-carbonization of a thermosetting resin.

2. Non-permeable carbonized formed bodies as set forth in claim 1, wherein the composition of said non-permeable carbonized formed bodies is adjusted to have a specific gravity of $y \geq 0.004x + 1.235$ where x is a weight ratio (%) of graphite/carbonaceous material of said formed bodies, and to have a gas permeability smaller than $10^{-4}$ cc/min.cm².atm per unit thickness in mm.

3. A method for producing non-permeable carbonized formed bodies, comprising:
   mixing and kneading a thermosetting resin powder, graphite powder and a thermosetting resin liquid in such proportions that the resulting forming composition will produce upon bake-carbonization a carbonaceous structure containing 5–50 wt% of graphite and the balance of glassy carbon formed by carbonization of said thermosetting resins;
   forming said composition into a predetermined shape; after drying and hardening treatments, subjecting said formed bodies to bake-carbonization in a non-oxidizing atmosphere.

4. The method as set forth in claim 3, wherein said thermosetting resin powder has an average particle size smaller than 50 microns and said graphite powder has an average particle size smaller than ½ of that of said thermosetting resin powder.

5. The method as set forth in claim 3, wherein the temperature of said bake-carbonization is in the range of 800° C.–2000° C.

6. The method as set forth in claim 3, wherein said forming composition is optionally added with an organic tackifier to be decomposed and evaporated during said bake-carbonization.

7. The method as set forth in claim 3, wherein the composition of said non-permeable carbonized formed bodies is adjusted to have a specific gravity of $y \geq 0.004x + 1.235$ where x is a weight ratio (%) of graphite/carbonaceous material of said formed bodies, and to have a gas permeability smaller than $10^{-4}$ cc/min.cm².atm per unit thickness in mm.

8. The method as set forth in claim 3, wherein said molding composition is extruded into a flat shape, rolled, dried and hardened, followed by bake-carbonization of the resulting hardened formed bodies in a non-oxidizing atmosphere.

9. The method as set forth in claim 8, wherein the formed composition is rolled at least two times with a reduction rate greater than 1/5 in each rolling operation.

10. The method as set forth in claim 9, wherein said formed composition is rolled in a direction perpendicular to a direction extrusion at least in one rolling operation.

11. The method as set forth in claim 3, wherein said forming composition consisting of said thermosetting resin powder, graphite powder and thermosetting resin liquid is formed body to shape, dried and hardened, and the resulting hardened formed bodies are impregnated with a thermosetting resin prior to bake-carbonization in a non-oxidizing atmosphere.

12. The method as set forth in claim 11, wherein said hardened formed bodies are impregnated with said thermosetting resin liquid under pressure.

* * * * *